(12) United States Patent
Saito

(10) Patent No.: US 11,495,209 B2
(45) Date of Patent: Nov. 8, 2022

(54) INFORMATION PRESENTATION DEVICE, AND INFORMATION PRESENTATION METHOD

(71) Applicant: SONY CORPORATION, Tokyo (JP)

(72) Inventor: Mari Saito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 758 days.

(21) Appl. No.: 16/325,992

(22) PCT Filed: Aug. 10, 2017

(86) PCT No.: PCT/JP2017/029195
§ 371 (c)(1),
(2) Date: Feb. 15, 2019

(87) PCT Pub. No.: WO2018/037951
PCT Pub. Date: Mar. 1, 2018

(65) Prior Publication Data
US 2021/0383793 A1    Dec. 9, 2021

(30) Foreign Application Priority Data
Aug. 25, 2016   (JP) .............................. JP2016-164364

(51) Int. Cl.
*G10L 15/00*       (2013.01)
*G10L 15/01*       (2013.01)
(Continued)

(52) U.S. Cl.
CPC ............ *G10L 15/01* (2013.01); *G10L 15/005* (2013.01); *G10L 17/02* (2013.01); *G10L 17/22* (2013.01)

(58) Field of Classification Search
CPC ....... G10L 15/01; G10L 15/005; G10L 17/02; G10L 17/22; G10L 15/22; G10L 15/1815;
(Continued)

(56) References Cited

U.S. PATENT DOCUMENTS 8,761,574 B2 *   6/2014   Miller .................. H04N 9/8715
                                                        386/239
9,697,632 B2 *   7/2017   Ono ...................... G11B 27/105
(Continued)

FOREIGN PATENT DOCUMENTS

JP       2000-278626 A       10/2000
JP       2001-282409 A       10/2001
(Continued)

*Primary Examiner* — Abdelali Serrou
(74) *Attorney, Agent, or Firm* — Paratus Law Group, PLLC

(57) ABSTRACT

There is provided an information presentation device that is configured to present information, to a plurality of users that differ in level, in such a manner that each of the users can easily understand the information, and an information presentation method. The information presentation device includes: an identification unit that identifies respective levels of one or more users; an obtaining unit that obtains presentation information to be presented to the users; a conversion unit that appropriately converts the obtained presentation information according to the level of each user; and a presentation unit that presents the appropriately converted presentation information to each user. The present technology can be applied to, for example, a robot, a signage device, a car navigation device, and the like.

12 Claims, 10 Drawing Sheets

(51) Int. Cl.
*G10L 17/02* (2013.01)
*G10L 17/22* (2013.01)

(58) Field of Classification Search
CPC ....... G10L 25/78; G06T 11/60; G06F 16/248;
G06F 16/26; G06Q 50/20; G09B 19/00;
G09B 5/00; G09B 5/02; G09B 5/06;
G09B 7/08
See application file for complete search history.

(56) References Cited

U.S. PATENT DOCUMENTS

| | | | | |
|---|---|---|---|---|
| 10,613,826 | B2* | 4/2020 | Imagawa | ................ G10L 15/26 |
| 2004/0128301 | A1* | 7/2004 | Thint | ................ G06F 16/9535 |
| 2010/0182230 | A1* | 7/2010 | Yamada | ................ G06F 40/157 |
| | | | | 345/156 |
| 2012/0013641 | A1* | 1/2012 | Kudo | ................ G06F 16/5866 |
| | | | | 345/629 |
| 2014/0099082 | A1* | 4/2014 | Miller | ...................... H04N 5/93 |
| | | | | 386/E5.028 |
| 2015/0336578 | A1* | 11/2015 | Lord | ........................ B60T 7/22 |
| | | | | 701/2 |
| 2016/0189554 | A1* | 6/2016 | Kim | ...................... H04L 67/12 |
| | | | | 434/365 |
| 2017/0046970 | A1* | 2/2017 | Liu | ......................... G09B 7/04 |
| 2017/0344854 | A1* | 11/2017 | Behringer | .............. G06N 20/00 |

FOREIGN PATENT DOCUMENTS

| | | |
|---|---|---|
| JP | 2010-020616 A | 1/2010 |
| JP | 2011-227849 A | 11/2011 |
| JP | 2013-143743 A | 7/2013 |
| JP | 2015-018163 A | 1/2015 |
| JP | 6460286 B2 | 1/2019 |

* cited by examiner

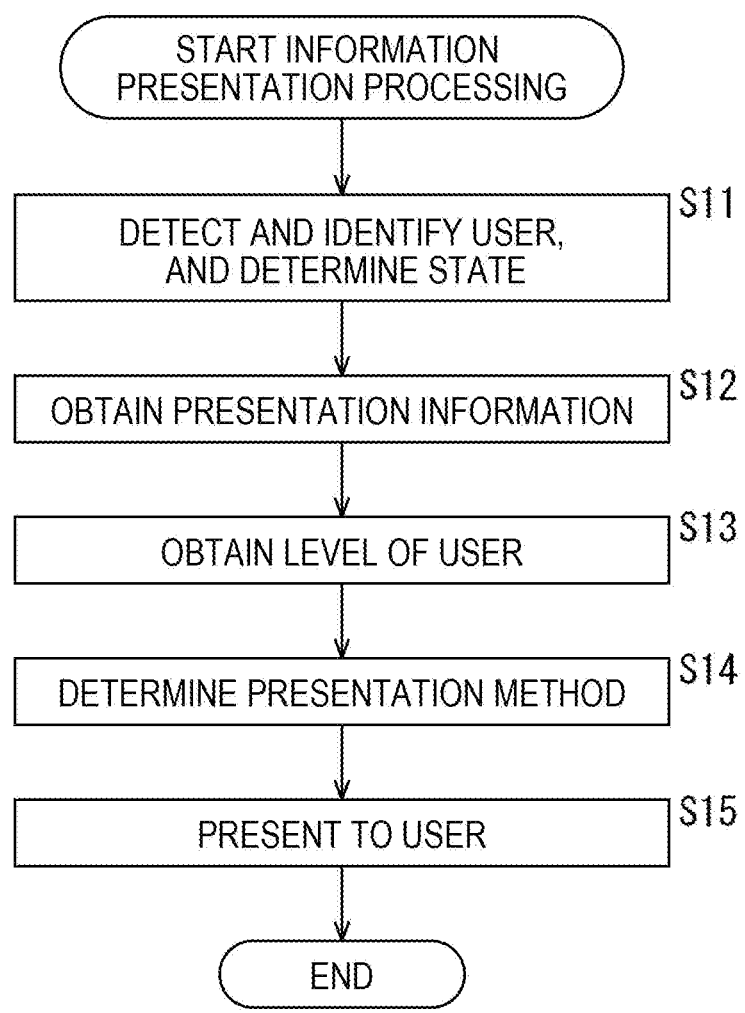

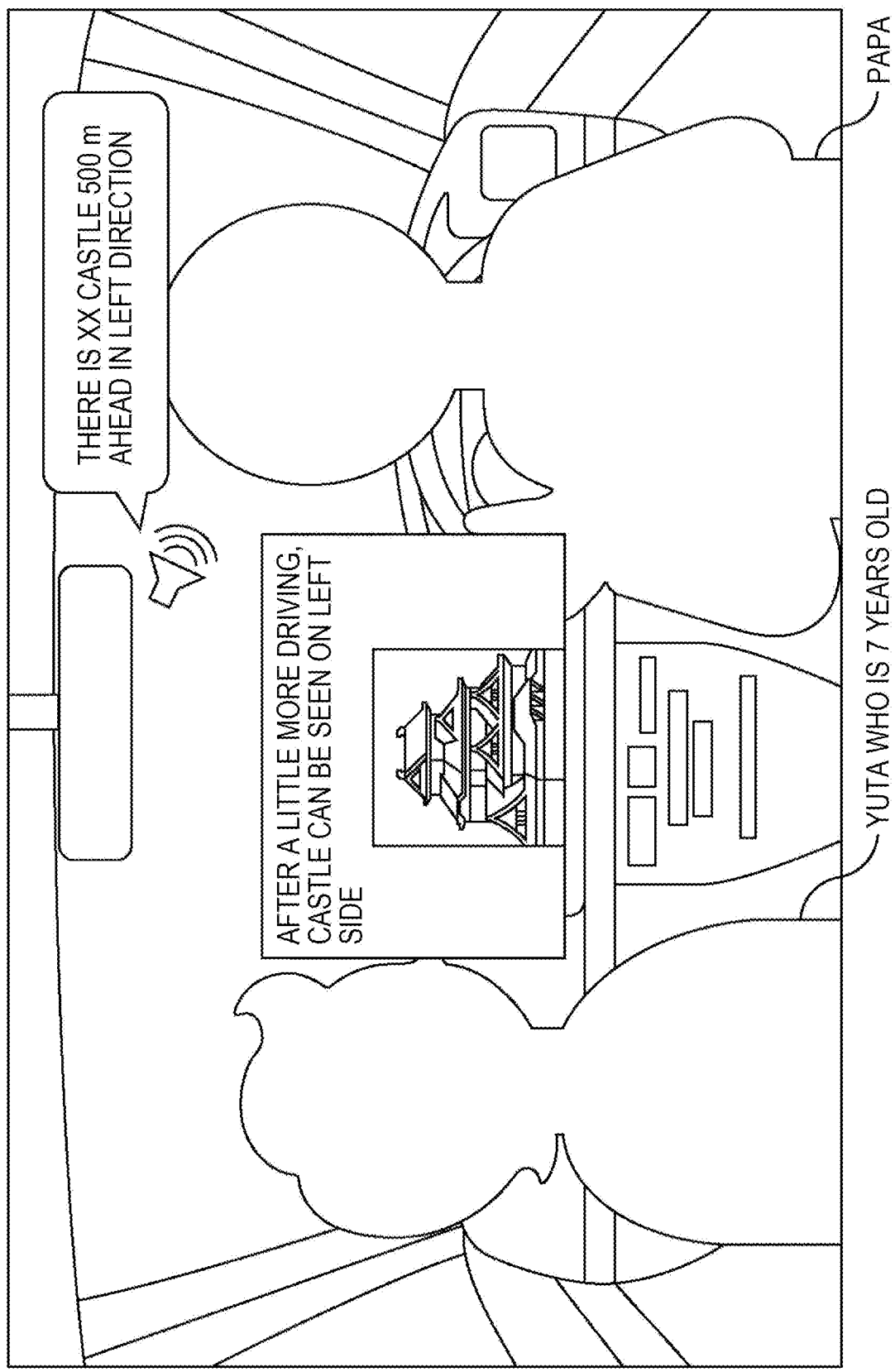

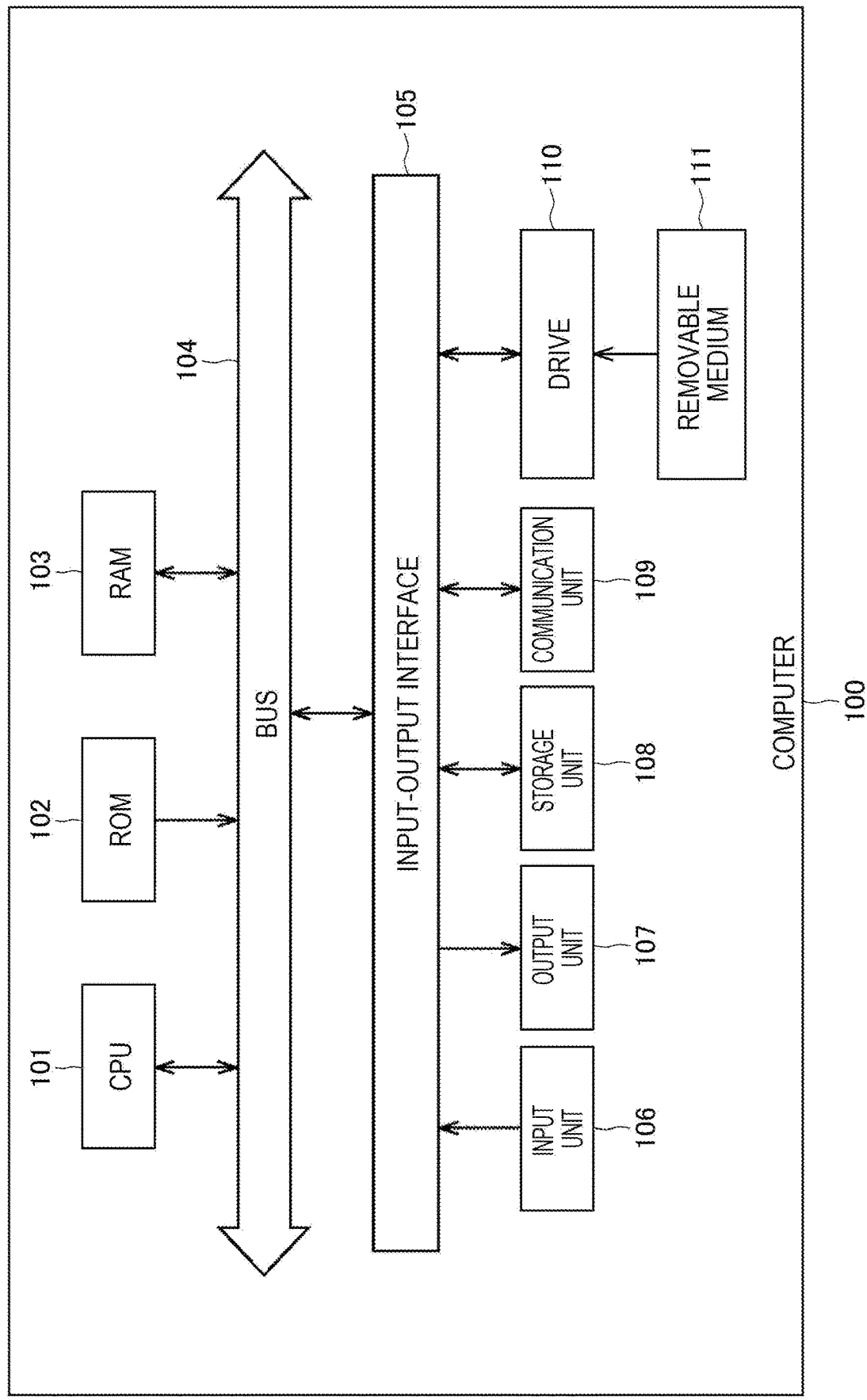

INFORMATION PRESENTATION DEVICE, AND INFORMATION PRESENTATION METHOD

CROSS REFERENCE TO PRIOR APPLICATION

This application is a National Stage Patent Application of PCT International Patent Application No. PCT/JP2017/029195 (filed on Aug. 10, 2017) under 35 U.S.C. § 371, which claims priority to Japanese Patent Application No. 2016-164364 (filed on Aug. 25, 2016), which are all hereby incorporated by reference in their entirety.

TECHNICAL FIELD

The present technology relates to an information presentation device and an information presentation method, and in particular, relates to an information presentation device that is configured to change a presentation method for presenting presentation information according to the age, knowledge level, language ability, or the like of a user, and relates to an information presentation method.

BACKGROUND ART

In a case where some kind of information (hereinafter referred to as "presentation information") is presented to a user by using characters or a voice, if the user is not at a knowledge level, or does not have language ability, required to understand the presentation information, for example, if the user is a child or a foreigner, the user may not be able to sufficiently understand contents of the presentation information.

As a method for coping with such a situation, there is proposed a method in which information is presented in a manner that enables easy understanding according to a knowledge level of a user, for example, by replacing words according to the knowledge level of the user that has been obtained beforehand (refer to, for example, Patent Document 1).

CITATION LIST

Patent Document

Patent Document 1: Japanese Patent Application Laid-Open No. 5-265677

SUMMARY OF THE INVENTION

Problems to be Solved by the Invention

In the conventional method described above, in a case where the user studies or grows up, with the result that the knowledge level or the language ability is improved, if the number of users is only one, changing level settings of the user suffices. However, in a case where information is presented to a plurality of users that differ in knowledge level or language ability, in order to make all of the users understand, it is necessary to present information in accordance with, for example, a user who is at the lowest level. Accordingly, information could not be presented to the users according to respective levels.

The present technology has been devised in consideration of such a situation, and an object of the present technology is to make it possible to present information to a plurality of users in a manner that enables easy understanding according to respective levels.

Solutions to Problems

The information presentation device according to one aspect of the present technology includes: an identification unit that identifies respective levels of one or more users; an obtaining unit that obtains presentation information to be presented to the users; a conversion unit that appropriately converts the obtained presentation information according to the level of each user; and a presentation unit that presents the appropriately converted presentation information to each user.

The identification unit is capable of identifying, as the level of the user, at least one of an age, a knowledge level, language ability, or a foreign-language learning level of the user.

The identification unit is capable of identifying the level of the user on the basis of information that is registered in a database beforehand.

The information presentation device according to one aspect of the present technology is capable of further including an estimation unit that estimates the level of the user, and registers the level in the database.

The estimation unit is capable of periodically executing processing of estimating the level of the user, and updating the level of the user in the database.

The presentation unit is capable of presenting the appropriately converted presentation information to each user by at least one of character display or voice output.

In a case where a plurality of users that differ in level concurrently share the information presentation device, the presentation unit is capable of displaying characters of the appropriately converted presentation information for a lower level user, and outputting a voice of the appropriately converted presentation information to a higher level user.

The information presentation device according to one aspect of the present technology is capable of further including a detection unit that detects respective states of the one or more users, in which in a case where a plurality of users that differ in state concurrently share the information presentation device, the presentation unit is capable of presenting the appropriately converted presentation information according to the state of the user.

The detection unit is capable of detecting whether or not the user is watching a display, and in a case where a user who is watching the display and a user who is not watching the display concurrently share the information presentation device, the presentation unit is capable of displaying characters of the appropriately converted presentation information for the user who is watching the display, and outputting a voice of the appropriately converted presentation information to the user who is watching the display.

The conversion unit is capable of converting words contained in the obtained presentation information into plainer words according to the level of the user.

The conversion unit is capable of converting Chinese characters contained in the obtained presentation information into hiragana characters, katakana characters, or Chinese characters with reading of the Chinese characters according to the level of the user.

The conversion unit is capable of converting a part or all of the obtained presentation information into a foreign language according to the level of the user.

The information presentation method according to one aspect of the present technology is executed by an information presentation device, the method including: an identification step of identifying respective levels of one or more users; an obtaining step of obtaining presentation information to be presented to the users; a conversion step of appropriately converting the obtained presentation information according to the level of each user; and a presentation step of presenting the appropriately converted presentation information to each user.

According to one aspect of the present technology, respective levels of one or more users are identified, presentation information to be presented to the users is obtained, the obtained presentation information is appropriately converted according to the level of each user, and the appropriately converted presentation information is presented to each user.

Effects of the Invention

According to one aspect of the present technology, information can be presented to a plurality of users that differ in level in a manner that enables the respective users to easily understand the information.

BRIEF DESCRIPTION OF DRAWINGS

FIG. 9 is a flowchart illustrating information presentation processing.

FIG. 10 is a diagram illustrating a case where an information presentation device is applied to a car navigation device.

FIG. 11 is a block diagram illustrating a configuration example of a general-purpose computer.

MODE FOR CARRYING OUT THE INVENTION

Best modes for carrying out the present technology (hereinafter referred to as "embodiments") will be described below in detail with reference to the drawings.

<Overview of the Present Technology>

First of all, an outline of the present technology will be described. The present technology relates to an information presentation device that is shared among one or more users. The information presentation device is configured to, when information is presented to the user (characters are displayed, and a voice is output), change a presentation method for presenting the information according to the age, knowledge level, language ability, foreign language learning level, or the like of the user. Hereinafter, the age, knowledge level, language ability, and foreign language learning level of the user are collectively referred to as a level of the user.

As information to be presented to a user (hereinafter referred to as "presentation information"), an action schedule, news and the like, related to the user and related parties thereof (family members and the like) can be mentioned. However, the kinds of the presentation information are not limited to the above, but are arbitrary.

An example in which a presentation method is changed according to a level of a user will be described below.

<Example in which Presentation Information is Presented, in Different Timings, to Two Users that Differ in Level>

Figure 1:
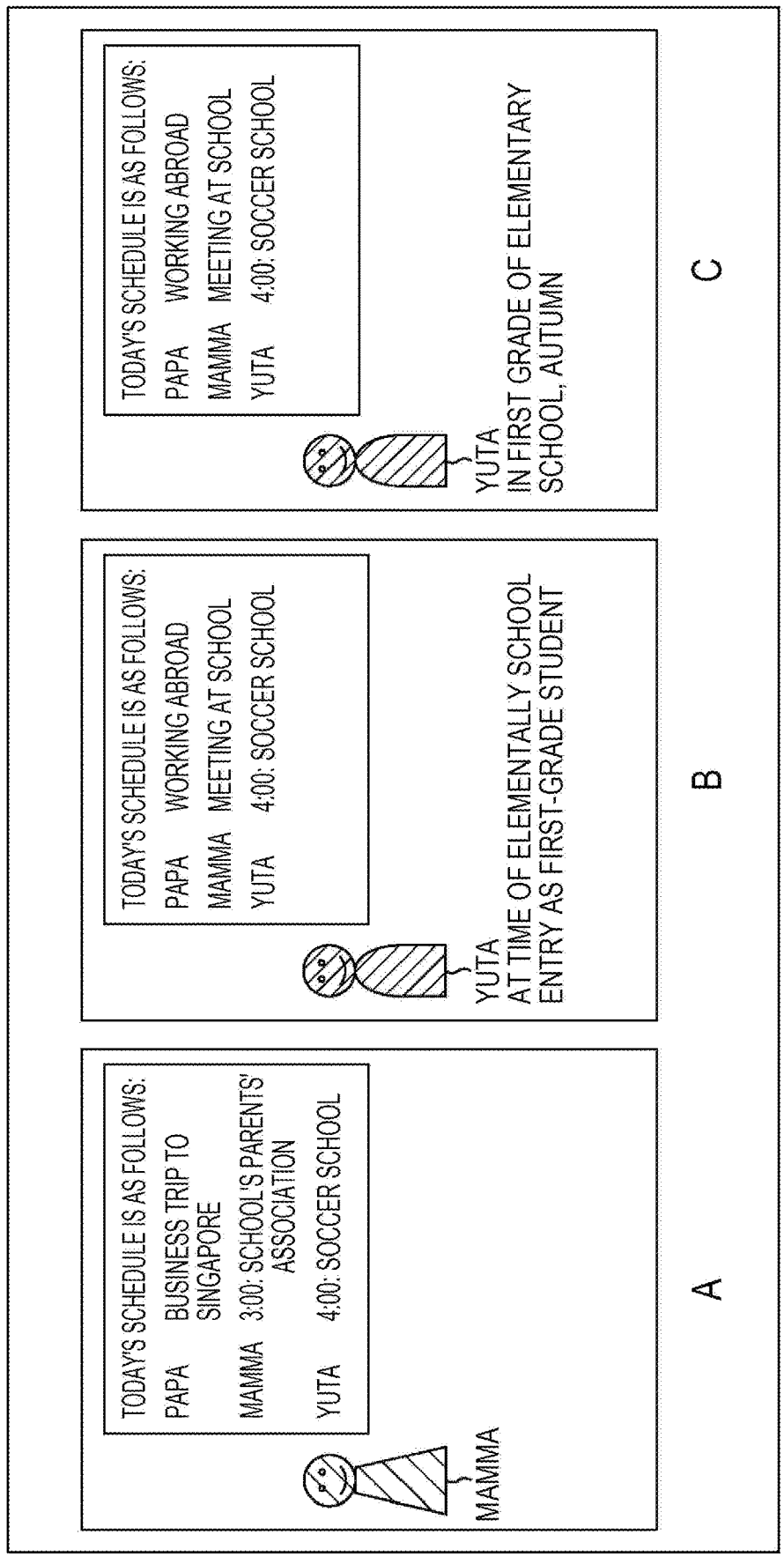
FIG. 1 is a diagram illustrating an example in which presentation information is presented, in different timings, to two users that differ in level.

FIG. 1 shows an example in which as two users that differ in level, a mother (mamma) and a child (Yuta) share an information presentation device in different timings. As the presentation information, today's schedules of family members (papa, mamma, and Yuta) are presented. It should be noted that characters described in a rectangular frame in the figure indicates that the characters are presented as character displaying.

A of the same figure shows a case where a user is detected, the user is identified as mamma, and a level of the user is high (the user has the knowledge level and language ability that are sufficient enough to understand the presentation information without any change). Incidentally, the number of user levels is two, high and low, for convenience of explanation. However, in actuality, the larger number of user levels is used for further multilevel discrimination.

In this case, for the high level user (mamma), the presentation information is displayed with characters without any change. It should be noted that a voice synthesized corresponding to the displayed characters may be output. This voice output may be always performed according to settings by the user, or may be performed only when the user does not watch characters displayed on a display. Moreover, the number of pieces of information displayed with characters, and main points thereof, may be output as a voice.

In addition, in a case where a voice is output, after presentation information is converted into spoken words, a synthesized voice may be generated from the spoken words before the synthesized voice is output. In order to convert the presentation information into spoken words, there are methods, for example, converting itemized words into sentences, supplementing with postpositional particles, auxiliary verbs, and skipping parentheses. More specifically, for example, presentation information "Papa, Business trip to Singapore" may be converted into spoken words "Papa is making a business trip to Singapore"; presentation information "4:00: soccer school" may be converted into spoken words "soccer school is at 4:00"; and presentation information "AA country's president (55 years old) visits Japan" may be converted into spoken words "AA country's president visits Japan".

B of the same figure shows a case where a user is detected, the user is identified as a child, and a level of the user is low (the user does not have the knowledge level and language ability that are sufficient enough to understand the presentation information without any change).

In this case, in order to enable a low level user (at the time of elementally school entry as a first-grade student) to understand, words that are assumed to be ununderstandable at the level of the user are replaced with plain words that are easier to understand, and Chinese characters that are considered to be unreadable are converted into hiragana characters before the hiragana characters are displayed; for example, "Business trip to Singapore" is replaced with "Working abroad". It should be noted that concurrently with displaying with characters, a voice synthesized corresponding to displayed characters may be output. In addition, as an alternative to converting Chinese characters into hiragana characters, the Chinese characters may be converted into katakana characters or the reading of the Chinese characters may be shown together with the Chinese characters.

C of the same figure shows a case where a user is detected, the user is identified as a child, and a level of the user is low (however, the level is higher than that at the time of B of the same figure).

In this case, in order to enable a user (in the first grade of the elementary school, autumn) to understand, words that are assumed to be ununderstandable at the level of the user are replaced with plain words, and Chinese characters that are considered to be unreadable are converted into hiragana characters before the hiragana characters are displayed; for example, "Business trip to Singapore" is replaced with "Working abroad". However, since the user has already learned Chinese characters "school", in the case of C of the same figure, "school" displayed in hiragana characters in B of the same figure is replaced with "school" displayed in Chinese characters. It should be noted that concurrently with displaying with characters, a voice synthesized corresponding to displayed characters may be output.

According to the example shown in FIG. 1, according to a level of the user, words contained in presentation information are replaced, or Chinese characters are converted into hiragana characters, before the presentation information is presented, and therefore understanding of a particularly low-level user can be deepened.

Further, in a case where presentation information such as a schedule and news is displayed with characters, for example, color coding may be used, or a display position may be changed, so as to enable whose schedule it is to be identified, or so as to enable an already-read state or a progress of each user to be determined.

<Example in which Presentation Information is Concurrently Presented to Two Users that Differ in Level>

Figure 2:
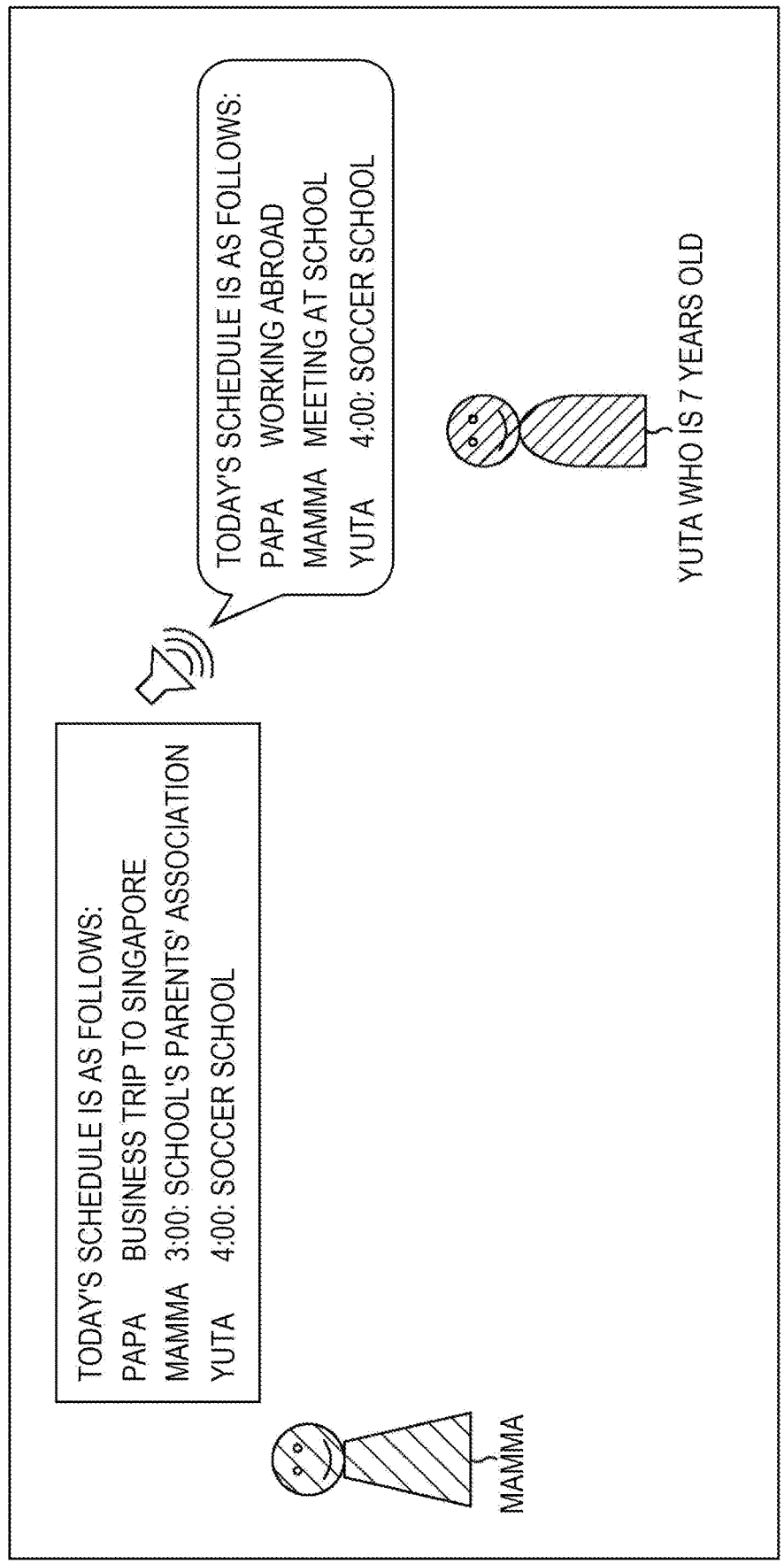
FIG. 2 is a diagram illustrating an example in which presentation information is concurrently presented to two users that differ in level.

FIG. 2 shows an example in which as two users that differ in level, the mother (mamma) and the child (Yuta) concurrently share the information presentation device. As the presentation information, today's schedules of family members (papa, mamma, and Yuta) are presented. It should be noted that characters described in a rectangular frame in the figure indicates presenting as character displaying, and characters described in a balloon indicates presenting as voice output. The same applies to figures hereafter.

The same figure shows a case where two users are detected, and are identified as a mamma and a child, and it is determined that a level of the mamma is high (having a knowledge level and language ability that are sufficient enough to understand presentation information without any change), and a level of the child is low (not having a knowledge level and language ability that are sufficient enough to understand presentation information without any change).

Usually, reading and understanding displayed characters requires a user to have a higher level in comparison with listening to and understanding an output voice. Accordingly, in this case, as information presentation to the high level user (mamma), the presentation information is displayed with characters without any change. Meanwhile, as information presentation to the low level user (child), words that are assumed to be ununderstandable are replaced with plain words, for example, "Business trip to Singapore" is replaced with "Working abroad", and a voice synthesized corresponding to the replaced words is then output.

It should be noted that in a case where directivity of a speaker for outputting a voice can be adjusted, the voice is output toward a target user (in this case, the child) for the information presentation by the voice output.

According to the example shown in FIG. 2, information is concurrently presented to the plurality of users that differ in level according to respective levels, in other words, the characters are displayed for one, and the voice is output to the other. Therefore, understanding of the plurality of users that differ in level can be concurrently deepened.

<Example in which Presentation Information is Concurrently Presented to Two Users that Differ in State>

Figure 3:
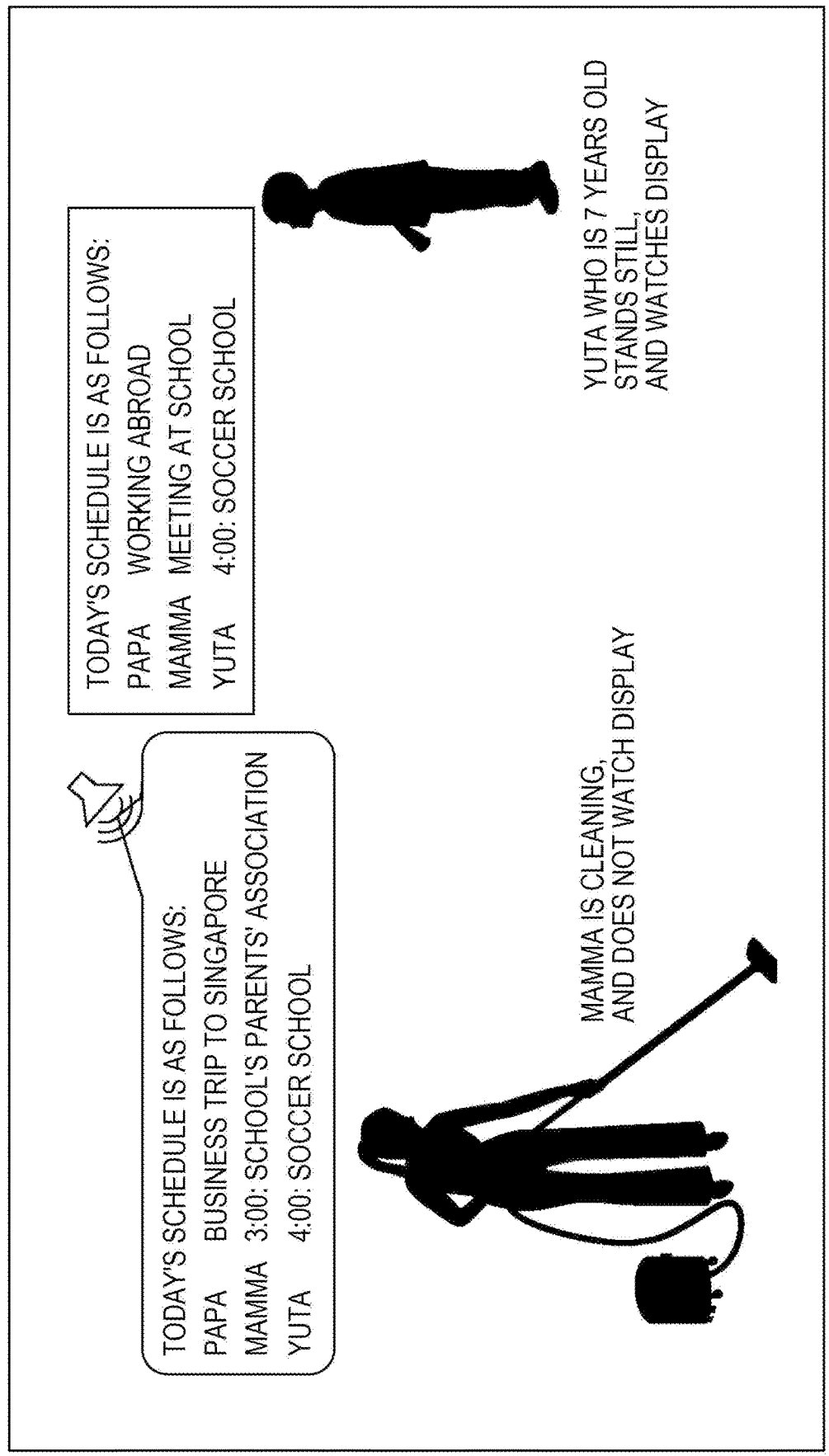
FIG. 3 is a diagram illustrating an example in which presentation information is concurrently presented to two users that differ in state.

FIG. 3 shows an example in which presentation information is concurrently presented to the mother (mamma) who is vacuuming, and the child (Yuta) who is watching the display of the information presentation device, as two users that differ in state. As the presentation information, today's schedules of family members (papa, mamma, and Yuta) are presented.

The same figure shows a case where two users (the mamma and the child) are detected and identified, respective levels thereof are determined, and respective states thereof are further determined (the mamma is not watching the display, and the child is watching the display).

Usually, reading and understanding displayed characters requires a user to have a higher level in comparison with listening to and understanding an output voice. However, in this case, the mamma who is a higher level user is not watching the display, and the child who is a lower level user is watching the display. Therefore, a voice is output to the user (the mamma), and characters are displayed for the user (the child).

In other words, as information presentation to the user (the mamma), a voice synthesized corresponding to the presentation information is output. Meanwhile, as information presentation to the user (the child), words that are assumed to be ununderstandable by the user (child) are replaced with plain words, for example, "Business trip to Singapore" is replaced with "Working abroad", and Chinese characters that are considered to be unreadable are converted into hiragana characters before the hiragana characters are presented as displayed characters. Incidentally, in a case where a plurality of voice outputting speakers, each of which has an adjustable directivity, are provided, the voice synthesized corresponding to the displayed characters may be concurrently output to the child too.

According to the example shown in FIG. 3, information is concurrently presented to the plurality of users that differ in state according to respective levels, in other words, the characters are displayed for one, and the voice is output to the other. Therefore, information can be presented in a manner that enables easy understanding of the plurality of users that differ in state.

<Example in which Words are Replaced with Foreign-Language Words According to Foreign-Language Learning Level of User>

Figure 4:
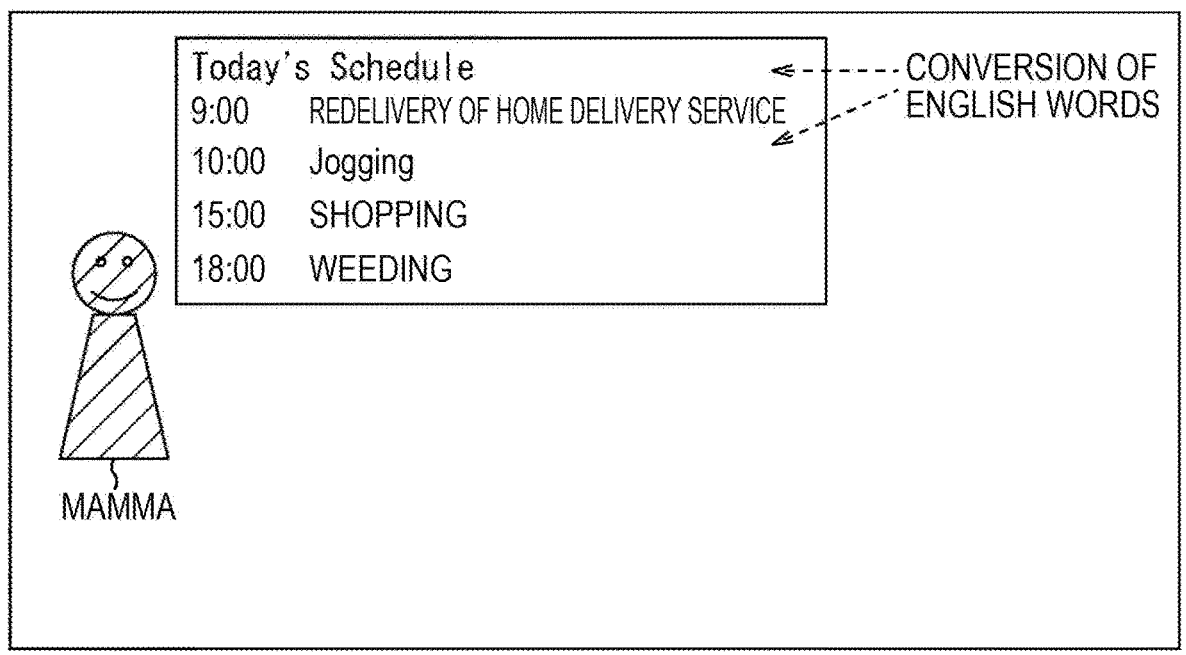
FIG. 4 is a diagram illustrating an example in which words of presentation information are converted into a foreign language according to a user's learning level.

FIG. 4 shows an example in which according to a foreign-language (in the case of FIG. 4, English) learning level of a user, Japanese sentences and words contained in presentation information are replaced with foreign-language words that have already been learned. As the presentation information, a today's schedule of a user (mamma) is presented.

In the case of the same figure, a user is detected, the user is identified as mamma, and a foreign-language learning level thereof is read from a user data base. Subsequently, according to the foreign-language learning level of the user (mamma), "Kyono Yotei (today's schedule)" and "Jogingu (jogging)" contained in the presentation information are replaced with foreign-language words "Today's Schedule" and "Jogging", and the replaced foreign-language words are then displayed with characters. It should be noted that depending on a foreign-language learning level of a user, presentation information may be entirely converted into foreign-language words before the converted foreign-language words are display with characters.

It should be noted that in accordance with displayed characters, a voice corresponding thereto may be output. It should be noted that with respect to a foreign language part of the voice output, speed thereof may be adapted to be changeable according to a foreign-language learning level. In addition, while all characters are displayed in Japanese, a corresponding voice may be output partially or entirely in a foreign language according to a learning level. Moreover, while all characters are represented in a foreign language, a corresponding voice may be output in Japanese, or while all characters are represented in Japanese, a corresponding voice may be output in a foreign language.

Incidentally, a foreign-language learning level of a user is estimated on the basis of the daily conversation and operation history of the user. However, a user may be allowed to set his/her foreign-language learning level beforehand (for example, in the case of English, at the level of junior high school first grade, at the second level of Eiken, at TOEFL 500 level, etc.). Alternatively, a learning text that is being used is set, and a learning level may be estimated from the learning text.

It should be noted that if an understanding level of the user for the presented foreign language seems to be low, an estimated learning level may be decreased. Further, the tendency of mistakes, which is found in other learners who are in the same learning level as the user, may be used. For example, in a case where other learners who are in the same learning level as the user have a tendency that in a case where an error is made in a sentence in the present progressive form, an error is also made even in a sentence in the past progressive form, in a case where the user has made an error in a sentence in the progressive form, the learning of the user may be supported by displaying a sentence in the past progressive form as well.

According to the example shown in FIG. 4, according to the learning level of the user, Japanese contained in the presentation information can be replaced with foreign language words that have already been learned, and therefore the user can check results of his/her own learning. Incidentally, if a user willingly sets his/her own foreign language ability at a rather high level, unlearned foreign language words can be displayed, and therefore an effect leading to an improvement in willingness to learn can be expected.

Incidentally, in a case where a learning level is in a basic stage, Japanese before replacement and foreign language words after the replacement may be represented together, and after the learning level has increased to some extent, the foreign language words after the replacement may be displayed alone.

In addition, for example, in a case where a user is a foreigner who is learning Japanese, characters may be represented after Chinese characters are converted into hiragana characters and katakana characters, or the reading of Chinese characters may be shown together with the Chinese characters, according to a learning level of Japanese.

<Example in which Information to be Added to Presentation Information is Changed According to User's Interest>

Figure 5:
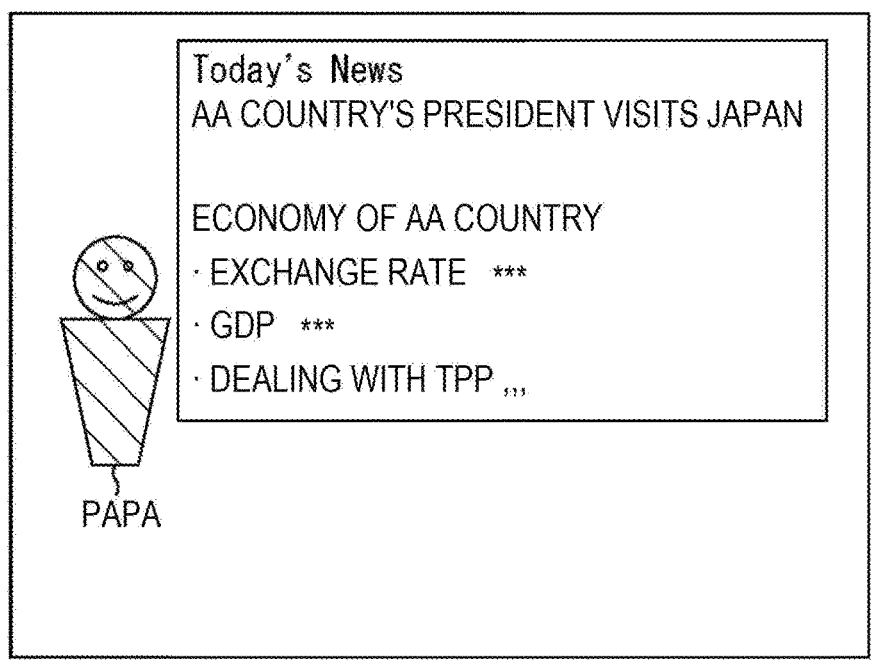
FIG. 5 is a diagram illustrating an example in which information to be added to presentation information is changed according to a user's interest.
Figure 6:
FIG. 6 is a diagram illustrating an example in which information to be added to presentation information is changed according to a user's interest.

FIGS. 5 and 6 each show, as an example, a case where in addition to presentation of presentation information, information related to the presentation information (hereinafter referred to as additional information) is presented.

FIG. 5 shows a case where a user is detected, the user is identified as papa, a level thereof is determined, and moreover, an interest region (economy) of the user (papa) is searched for from the user DB (database).

In this case, for the user (papa), "Toda's News, AA country's president visits Japan" is displayed with characters as presentation information. Moreover, "Economy of AA country, Exchange rate, GDP, etc." is displayed with characters as additional information related to the presentation information. It should be noted that a voice synthesized corresponding to character displaying of the presentation information and the additional information may be concurrently output.

FIG. 6 shows a case where a user is detected, the user is identified as mamma, a level thereof is determined, and moreover, an interest region (culture) of the user (mamma) is searched for from the user DB. In this case, for the user (mamma), "Toda's News, AA country's president visits Japan" is displayed with characters as presentation information. Moreover, "Culture of AA country, Cooking ABC, Craft products XYZ, etc." is displayed with characters as additional information related to the presentation information. It should be noted that a voice synthesized corresponding to character displaying of the presentation information and the additional information may be concurrently output. In addition, for an article related to schedules of family members, the article including, for example, news of a specific area that is being examined as a travel destination in the near future, in order to attract interest, when the article is displayed, for example, corresponding schedules of family members may be displayed on purpose.

It should be noted that with respect to the interest region of each user, keywords are extracted beforehand from categories in which each user has searched for, contents that have been viewed, schedules that have been input, contents of emails, and the like, an interest region is then estimated from the extracted keywords, and the estimated interest region has only to be registered in the user DB. In addition, the user himself/herself may register his/her own interest region in the user DB beforehand.

According to the examples shown in FIGS. 5 and 6, information that interests the user can be added to presentation information before the presentation information is presented. Incidentally, for example, in a case where users (papa and mamma), who are shown in FIGS. 5 and 6 respectively, concurrently share the information presentation device and watch the display, additional information for each user may be displayed on the side on which the corresponding user exists. In other words, in a case where when facing the display, the user (papa) exists on the left side, and the user (mamma) exists on the right side, the presentation information is displayed with characters in the central part of the display, the additional information intended for papa may be displayed with characters on the left side thereof, and the additional information intended for mamma may be displayed with characters on the right side thereof.

It should be noted that the examples described with reference to FIGS. 1 to 6 may be executed in combination as appropriate.

<Configuration Example of Information Presentation Device that is Embodiment of Present Technology>

Figure 7:
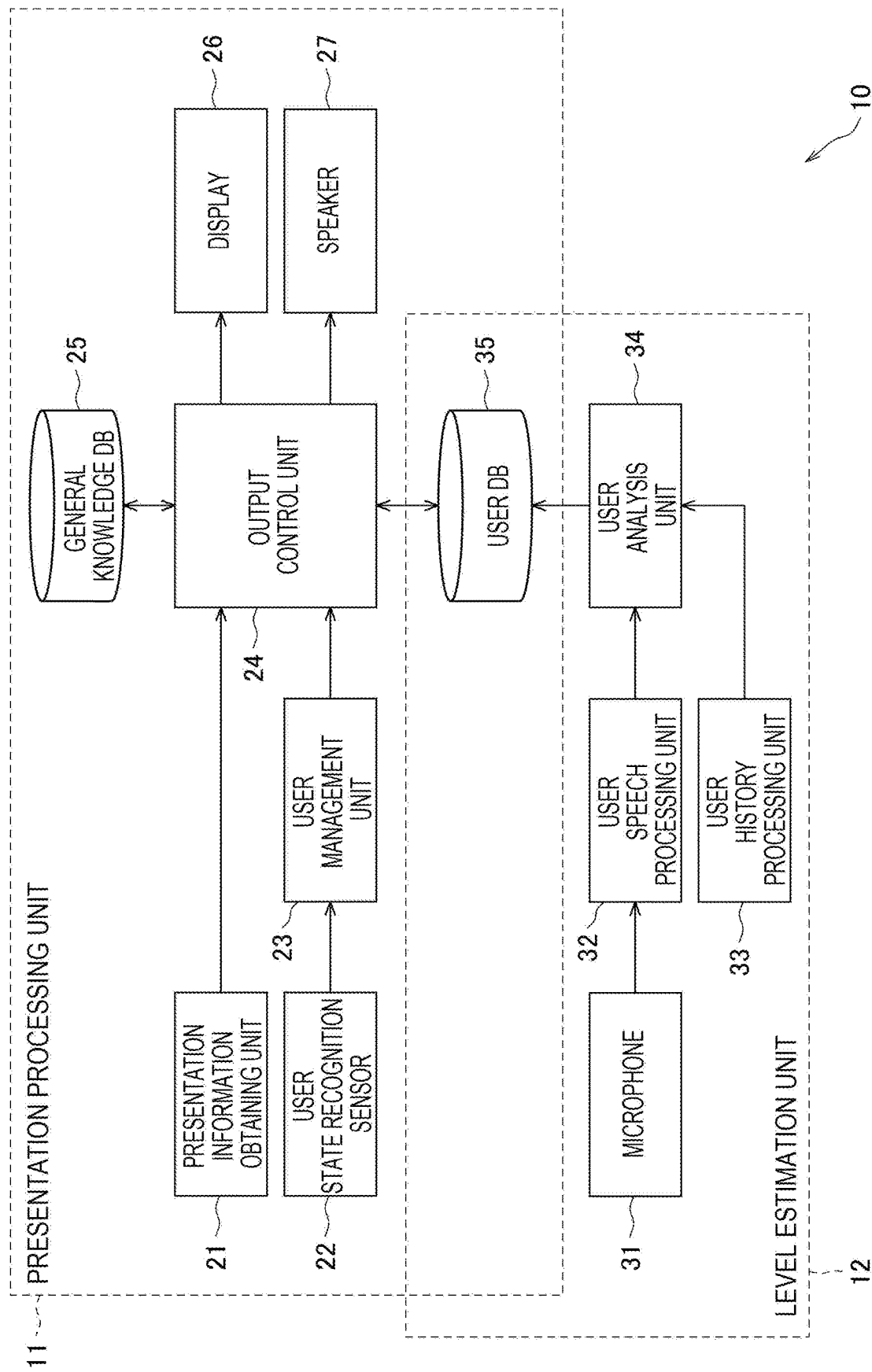
FIG. 7 is a block diagram illustrating a configuration example of an information presentation device to which the present technology is applied.

Next, FIG. 7 shows a configuration example of an information presentation device that is an embodiment of the present technology for realizing the various examples described above.

This information presentation device 10 is provided with a presentation processing unit 11, and a level estimation unit 12. The presentation processing unit 11 is used to execute information presentation processing of presenting presentation information to a user, the presentation processing unit 11 including a presentation information obtaining unit 21, a user state recognition sensor 22, a user management unit 23, an output control unit 24, a general information DB 25, a display 26, and a speaker 27.

The level estimation unit 12 is used to execute level estimation processing of estimating a level of a user, the level estimation unit 12 including a microphone 31, a user speech processing unit 32, a user history processing unit 33, a user analysis unit 34, and a user DB 35. It should be noted that the user DB 35 also belongs to the presentation processing unit 11.

The presentation information obtaining unit 21 of the presentation processing unit 11 accesses an information terminal (for example, a smart phone, a personal computer, etc.) used by the user, and a predetermined server, in response to a request from the output control unit 24, obtains presentation information that should be presented to the user, and supplies the obtained presentation information to the output control unit 24. It should be noted that the user may be allowed to input the presentation information directly into the information presentation device 10.

The user state recognition sensor 22 includes a camera for image-capturing surroundings of the information presentation device 10, a microphone for obtaining a sound, a signal processing circuit that is capable of analyzing the video and the sound, and the like. The user state recognition sensor 22 detects one or more users who exist around the information presentation device 10, identifies who the users are (papa, mamma, child, etc.), determines a situation of the identified user (for example, whether or not the user is watching the display 26, whether or not the user understands character displaying and voice output, or the like), and notifies the user management unit 23 of the situation. As a method for identifying who the user is, characteristics such as a face of the user may be registered beforehand, or a unique ID tag may be added to each user The user management unit 23 always notifies the output control unit 25 of information indicating who exists around the information presentation device 10, and indicating a specific state of the user who exists around the information presentation device 10, on the basis of the notification from the user state recognition sensor 22.

On the basis of the notification from the user management unit 23, the output control unit 24 requests the presentation information obtaining unit 21 to supply presentation information that should be presented to the user who has been detected to exist around the information presentation device 10, and analyzes the presentation information supplied in response to the request. In addition, the output control unit 24 obtains a level of the user from the user DB 35, converts the presentation information as appropriate according to the level of the user by referring to the general knowledge DB 25, and causes the presentation information to be presented to the user by at least one of character displaying or voice representation. Concurrently with the above, the output control unit 24 synthesizes a voice corresponding to the presentation information that has been converted as appropriate according to the level of the user, and causes the voice to be presented to the user.

Moreover, the output control unit 24 obtains an interest region of the user from the user DB 35, and obtains information that relates to the presentation information, and that belongs to the interest region of the user, from the general knowledge DB 25, and causes the information to be presented to the user.

The general knowledge DB 25 registers therein: an easy expression that has the same meaning as a word or a sentence that may exist in presentation information, and that is understandable according to age or the like; an expression in a foreign language; Chinese characters and English words that are learned in each school year (for each textbook of each publishing company); a vocabulary corresponding to a foreign language ability level; and information associated on the basis of a thesaurus (for example, an economic condition, culture information, and the like of the AA country in the example shown in FIG. 5 or FIG. 6). The general knowledge DB 25 is updated as needed.

The display 26 displays, with characters, presentation information that has been converted as appropriate according to a user's level according to the control from the output control unit 24. The speaker 27 outputs a voice synthesized corresponding to the presentation information that has been converted as appropriate according to the user's level according to the control from the output control unit 24. It should be noted that in a case where the directivity of the speaker 27 can be adjusted, the output voice is directed toward a target user for the presentation by the voice output.

The microphone 31 of the level estimation unit 12 collects conversations of the detected and identified user, and outputs the conversations to the user speech processing unit 32. The user speech processing unit 32 analyzes the conversations of the user, and notifies the user analysis unit 34 of an analysis result.

The user history processing unit 33 accesses the information terminal used by the user, and obtains operation histories (for example, a search history, a reproduction history of contents, a text input history of text input including a schedule, an email, a document, etc.) of the user in an external device, and supplies the operation histories to the user analysis unit 34.

The user analysis unit 34 estimates a level (including the age, knowledge level, and language ability of the user) of each user on the basis of input from the user speech processing unit 32 and the user history processing unit 33, and registers the level in the user DB 35.

Basic information of each user (the date of birth, distinction of sex, occupation, school year, etc.) is registered beforehand in the user DB 35 by the user. Besides the basic information, a level of each user estimated by the user analysis unit 34 is registered in the user DB 35. It should be noted that a user is allowed to register a user's own level, and other users' levels as well. For example, the mamma can also register the level of the child in the user DB 35. In addition, a user may be allowed to refer to a user's own level and history, and other users' levels and histories in any timing.

<Level Estimation Processing by Information Presentation Device 10>

Figure 8:
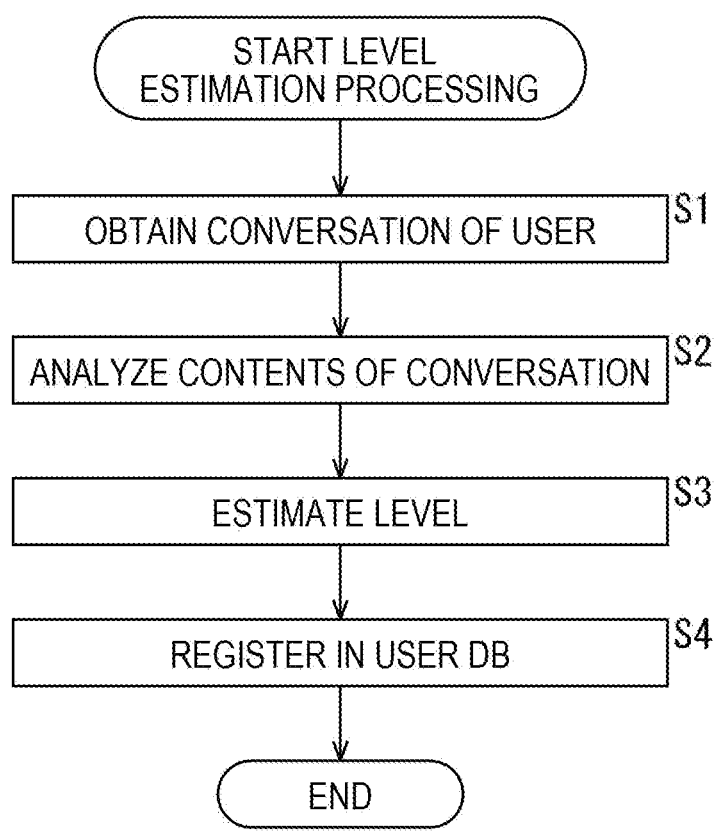
FIG. 8 is a flowchart illustrating level estimation processing.

Next, FIG. 8 is a flowchart illustrating level estimation processing by the level estimation unit 12 of the information presentation device 10.

This level estimation processing is executed in an early stage in which the use of the information presentation device 10 is started. Subsequently, the level estimation processing is executed in a cycle in which a user's level can change (for example, every month).

In step S1, the level estimation unit 12 collects conversations of a user that has been detected and identified by the microphone 31, and outputs the conversations to the user speech processing unit 32. In step S2, the user speech processing unit 32 analyzes the conversations of the user, and notifies the user analysis unit 34 of an analysis result. It should be noted that the user speech processing unit 32 may be configured to analyze the conversations of the user every time a certain amount of voice data of the conversations made by the user is collected.

In step S3, the user history processing unit 33 accesses the information terminal used by the user, obtains the operation histories of the user in the external device, and supplies the operation histories to the user analysis unit 34. The user analysis unit 34 estimates a level of each user on the basis of input from the user speech processing unit 32 and the user history processing unit 33, and registers the level in the user DB 35. After the above-described steps, the level estimation processing ends.

According to the level estimation processing described above, even if the user himself/herself is not aware of an improvement in level, with the result that the user does not set the user's own level or other users' levels, a level of each user can be registered in the user DB 35, and the level can be updated. Accordingly, even in a case where a child user grows up, exhibits an increase in his/her vocabulary, or achieves an improvement in foreign-language learning level, presentation information can be presented corresponding thereto.

<Information Presentation Processing by Information Presentation Device 10>

Next, FIG. 9 is a flowchart illustrating information presentation processing by the presentation processing unit 11 of the information presentation device 10. Differently from the above-described level estimation processing, this information presentation processing is executed every time the information presentation device 10 is started up.

In step S11, the user state recognition sensor 22 detects and identifies one or more users who exist around the information presentation device 10, and determines a situation of the user, and notifies the user management unit 23 of the user and the situation thereof. The user management unit 23 notifies the output control unit 25 of information indicating who exists around the information presentation device 10, and indicating a specific state of the user who exists around the information presentation device 10, on the basis of the notification from the user state recognition sensor 22.

In step S12, on the basis of the notification from the user management unit 23, the output control unit 24 requests the presentation information obtaining unit 21 to obtain presentation information that should be presented to the detected and identified user. In response to this request, the presentation information obtaining unit 21 obtains the presentation information that should be presented to the user, and supplies the presentation information to the output control unit 24.

In step S13, the output control unit 24 obtains a level of the user from the user DB 35, and determines a presentation method such as that shown in the examples in FIGS. 1 to 6 according to the level and situation of the user. In step S14, the output control unit 24 presents the presentation information to the user (performs at least one of character display or voice output) according to the determined presentation method. After the above-described steps, the information presentation processing ends.

Incidentally, although omitted from the information presentation processing described above, as shown in FIGS. 5 and 6, information that is related to the presentation information, and that belongs to an interest region of the user, may be presented to the user.

According to the information presentation processing described above, presentation information can be presented to each of one or more users, the presentation information having been converted as appropriate according to levels of the respective users. Therefore, even in a case where users that differ in level concurrently use presentation information, each user can deepen understanding of the presentation information.

<Application of Information Presentation Device 10 to Car Navigation Device>

Next, FIG. 10 shows an application example in which the information presentation device 10 is applied to a car navigation device.

The example of FIG. 10 shows a case where two users (the papa and the child) are detected and recognized, levels thereof are determined, and states of the users (the papa is not watching the display (during driving), and the child is watching the display) are further determined.

To the user (papa) who is driving and therefore cannot watch the display, a voice synthesized corresponding to presentation information as the car navigation device "There is the XX castle 500 m ahead in the left direction" is output. Meanwhile, to the user (Yuta) who is watching the display, "After a little more driving, a castle can be seen on the left side", into which the presentation information as the car navigation device "There is the XX castle 500 m ahead in the left direction" has been converted as appropriate according to the level of the user, is displayed with characters.

It should be noted that to the user (Yuta), a voice that is the same as character displaying "After a little more driving, a castle can be seen on the left side" may be further synthesized and output. However, in this case, the voice is output in the timing shifted from the timing in which the voice is output to the user (papa), or the voice is output with the directivity direction of the speaker directed toward a target user. Thus, the voice has only to be output in such a manner that both of the two users can easily listen to the voice.

In a case where the information presentation device 10 is applied to a car navigation device, presentation information can be presented, by means of voice output, to a user who is driving. Meanwhile, to a user who is not driving, a presentation method, which is converted according to a level of the user, can be presented by character displaying. Therefore, information can be more intelligibly presented without sacrificing the safety of any user in a vehicle.

Incidentally, as an application example of the information presentation device 10, the information presentation device 10 can be applied not only to the above-described car navigation device, but also for example, to a robot, a signage device, or the like.

<In a Case where the Series of Processing Described Above is Executed by Software>

Incidentally, the series of processing described above can be executed by hardware, and can also be executed by software. In a case where the series of processing is executed by software, a program that configures the software is installed in a computer. Here, the computer includes a computer that is built into dedicated hardware, and a computer that is capable of executing various kinds of functions by installing various kinds of programs, for example, a general-purpose personal computer and the like.

FIG. 10 is a block diagram illustrating a configuration example of hardware of a computer that executes, by a program, a series of processing performed by the above-described information presentation device 10.

In the computer, a central processing unit (CPU) 101, a read only memory (ROM) 102, and a random access memory (RAM) 103 are mutually connected through a bus 104.

An input-output interface 105 is further connected to the bus 104. An input unit 106, an output unit 107, a storage unit 108, a communication unit 109, and a drive 110 are connected to the input-output interface 105.

The input unit 106 includes a keyboard, a mouse, a microphone, and the like. The output unit 107 includes a display, a speaker, and the like. The storage unit 108 includes a hard disk, a nonvolatile memory, and the like. The communication unit 109 includes a network interface and the like. The drive 110 drives a removable medium 111 such as a magnetic disk, an optical disk, a magneto-optical disk, or a semiconductor memory.

In the computer 100 that is configured as described above, the CPU 101 loads, for example, a program stored in the storage unit 108 into the RAM 103 through the input-output interface 105 and the bus 104, then executes the program, and consequently the above-described series of processing is performed.

The program executed by the computer (CPU 101) can be provided by being recorded, for example, in a removable medium 211 such as a package medium. In addition, the program can be provided through a wired or wireless transmission medium such as a local area network, the Internet, and digital satellite broadcasting.

It should be noted that the program executed by the computer 100 may be a program in which processing is time-sequentially performed along the order described in the present description, or may be a program in which processing is performed in parallel or in the required timing, for example, when a call is made.

It should be noted that embodiments of the present technology are not limited to the embodiments described above, and various modifications can be made within the scope that does not deviate from the gist of the present technology.

The present technology can also employ the following configurations.

(1)
An information presentation device including:
an identification unit that identifies respective levels of one or more users;
an obtaining unit that obtains presentation information to be presented to the users;
a conversion unit that appropriately converts the obtained presentation information according to the level of each user; and
a presentation unit that presents the appropriately converted presentation information to each user.

(2)
The information presentation device set forth in the preceding (1), in which
the identification unit identifies, as the level of the user, at least one of an age, a knowledge level, language ability, or a foreign-language learning level of the user.

(3)
The information presentation device set forth in the preceding (1) or (2), in which
the identification unit identifies the level of the user on the basis of information that is registered in a database beforehand.

(4)
The information presentation device set forth in the preceding (3), further including
an estimation unit that estimates the level of the user, and registers the level in the database.

(5)
The information presentation device set forth in the preceding (4), in which
the estimation unit periodically executes processing of estimating the level of the user, and updates the level of the user in the database.

(6)
The information presentation device set forth in any of the preceding (1) to (5), in which
the presentation unit presents the appropriately converted presentation information to each user by at least one of character display or voice output.

(7)
The information presentation device set forth in any of the preceding (1) to (5), in which
in a case where a plurality of users that differ in level concurrently share the information presentation device, the presentation unit displays characters of the appropriately converted presentation information for a lower level user, and outputs a voice of the appropriately converted presentation information to a higher level user.

(8)
The information presentation device set forth in any of the preceding (1) to (5), further including
a detection unit that detects respective states of the one or more users, in which
in a case where a plurality of users that differ in state concurrently share the information presentation device, the presentation unit presents the appropriately converted presentation information according to the state of the user.

(9)
The information presentation device set forth in the preceding (8), in which
the detection unit detects whether or not the user is watching a display, and
in a case where a user who is watching the display and a user who is not watching the display concurrently share the information presentation device, the presentation unit displays characters of the appropriately converted presentation information for the user who is watching the display, and outputs a voice of the appropriately converted presentation information to the user who is watching the display.

(10)
The information presentation device set forth in any of the preceding (1) to (9), in which
the conversion unit converts words contained in the obtained presentation information into plainer words according to the level of the user.

(11)

The information presentation device set forth in any of the preceding (1) to (9), in which the conversion unit converts Chinese characters contained in the obtained presentation information into hiragana characters, katakana characters, or Chinese characters with reading of the Chinese characters according to the level of the user.

(12)

The information presentation device set forth in any of the preceding (1) to (9), in which the conversion unit converts a part or all of the obtained presentation information into a foreign language according to the level of the user.

(13)

An information presentation method of an information presentation device, the method being executed by the information presentation device, the method including:

an identification step of identifying respective levels of one or more users;

an obtaining step of obtaining presentation information to be presented to the users;

a conversion step of appropriately converting the obtained presentation information according to the level of each user; and a presentation step of presenting the appropriately converted presentation information to each user.

REFERENCE SIGNS LIST

10 Information presentation device
11 Presentation processing unit
12 Level estimation unit
21 Presentation information obtaining unit
22 User state recognition sensor
23 User management unit
24 Output control unit
25 General knowledge DB
26 Display
27 Speaker
31 Microphone
32 User speech processing unit
33 User history processing unit
34 User analysis unit
35 User DB
100 Computer
101 CPU

The invention claimed is:

1. An information presentation device comprising:
an identification unit configured to identify respective levels of one or more users;
a detection unit configured to detect a respective state of each respective user of the one or more users by detecting whether or not the respective user is watching a display;
an obtaining unit configured to obtain presentation information to be presented to the one or more users;
a conversion unit configured to appropriately convert the obtained presentation information according to the level of each user; and
a presentation unit configured to present the appropriately converted presentation information to each user,
wherein the identified respective levels of the one or more users are estimated based on collected conversations of the one or more users,
wherein, in a case where a first user of the one or more users who is watching the display and a second user of the one or more users who is not watching the display concurrently share the information presentation device, the presentation unit presents the appropriately converted presentation information by displaying characters of the appropriately converted presentation information for the first user who is watching the display, and outputting a synthesized voice of the appropriately converted presentation information to the second user who is not watching the display, and wherein the identification unit, the detection unit, the obtaining unit, the conversion unit, and the presentation unit are each implemented via at least one processor.

2. The information presentation device according to claim 1,
wherein the identification unit identifies, as the respective level of each respective user, at least one of an age, a knowledge level, language ability, or a foreign-language learning level of the respective user.

3. The information presentation device according to claim 2,
wherein the identification unit identifies the respective level of each respective user on the basis of information that is registered in a database beforehand.

4. The information presentation device according to claim 3, further comprising:
an estimation unit configured to
estimate the level of each user, and
register the estimated level in the database,
wherein the estimation unit is implemented via at least one processor.

5. The information presentation device according to claim 4,
wherein the estimation unit is further configured to
periodically execute processing of estimating the level of each user, and
update the registered level of each user in the database.

6. The information presentation device according to claim 2,
wherein the presentation unit presents the appropriately converted presentation information to each user by at least one of character display or voice output.

7. The information presentation device according to claim 2,
wherein in a case where a plurality of users that differ in level concurrently share the information presentation device, the presentation unit presents the appropriately converted presentation information by displaying characters of the appropriately converted presentation information for a lower level user, and outputting a voice of the appropriately converted presentation information to a higher level user.

8. The information presentation device according to claim 2, wherein
the conversion unit converts the obtained presentation information by converting words contained in the obtained presentation information into plainer words according to the level of each user.

9. The information presentation device according to claim 2, wherein
the conversion unit converts the obtained presentation information by converting Chinese characters contained in the obtained presentation information into at least one of hiragana characters, katakana characters, or Chinese characters with reading of the Chinese characters according to the level of each user.

10. The information presentation device according to claim 2, wherein
the conversion unit converts the obtained presentation information by converting a part or all of the obtained presentation information into a foreign language according to the level of each user.

11. An information presentation method of an information presentation device, the method being executed by the information presentation device, the method comprising:
identifying respective levels of one or more users;
detecting a respective state of each respective user of the one or more users by detecting whether or not the respective user is watching a display;
obtaining presentation information to be presented to the one or more users;
appropriately converting the obtained presentation information according to the level of each user; and
presenting the appropriately converted presentation information to each user,
wherein the identified respective levels of the one or more users are estimated based on collected conversations of the one or more users, and
wherein, in a case where a first user of the one or more users who is watching the display and a second user of the one or more users who is not watching the display concurrently share the information presentation device, the appropriately converted presentation information is presented by displaying characters of the appropriately converted presentation information for the first user who is watching the display, and outputting a synthesized voice of the appropriately converted presentation information to the second user who is not watching the display.

12. A non-transitory computer-readable storage medium having embodied thereon a program, which when executed by a computer causes the computer to execute a method, the method comprising:
identifying respective levels of one or more users;
detecting a respective state of each respective user of the one or more users by detecting whether or not the respective user is watching a display;
obtaining presentation information to be presented to the one or more users;
appropriately converting the obtained presentation information according to the level of each user; and
presenting the appropriately converted presentation information to each user,
wherein the identified respective levels of the one or more users are estimated based on collected conversations of the one or more users, and
wherein, in a case where a first user of the one or more users who is watching the display and a second user of the one or more users who is not watching the display concurrently share the information presentation device, the appropriately converted presentation information is presented by displaying characters of the appropriately converted presentation information for the first user who is watching the display, and outputting a synthesized voice of the appropriately converted presentation information to the second user who is not watching the display.

* * * * *